United States Patent
Spruit et al.

[11] Patent Number: 5,978,351
[45] Date of Patent: Nov. 2, 1999

[54] OPTICAL RECORDING MEDIUM WITH RECORDING CONTROL INFORMATION

[75] Inventors: Johannes H. M. Spruit; Winslow N. Mimnagh, both of Eindhoven, Netherlands

[73] Assignee: U.S. Philips Corporation, New York, N.Y.

[21] Appl. No.: 08/982,883

[22] Filed: Dec. 2, 1997

[30] Foreign Application Priority Data

Dec. 6, 1996 [EP] European Pat. Off. ............. 96203397
Dec. 24, 1996 [EP] European Pat. Off. ............. 96203717

[51] Int. Cl.⁶ ..................................................... G11B 7/24
[52] U.S. Cl. ..................................... 369/275.3; 369/275.2
[58] Field of Search ............................. 369/275.3, 275.2, 369/58, 116, 54, 13, 48

[56] References Cited

U.S. PATENT DOCUMENTS

| | | | |
|---|---|---|---|
| 4,901,300 | 2/1990 | Van Der Zande et al. | 369/47 |
| 5,187,699 | 2/1993 | Raaymakers et al. | 369/48 |
| 5,226,027 | 7/1993 | Bakx | 369/58 |
| 5,249,172 | 9/1993 | Hagihara et al. | 369/116 |
| 5,268,893 | 12/1993 | Call et al. | 369/116 |
| 5,450,383 | 9/1995 | Call et al. | 369/116 |
| 5,513,165 | 4/1996 | Ide et al. | 369/116 |
| 5,617,399 | 4/1997 | Spruit et al. | 369/116 |
| 5,629,913 | 5/1997 | Kaku et al. | 369/116 |
| 5,825,724 | 10/1998 | Matsumoto et al. | 369/13 |
| 5,831,943 | 11/1998 | Kurita et al. | 369/13 |

FOREIGN PATENT DOCUMENTS

| | | |
|---|---|---|
| 0397238A1 | 11/1990 | European Pat. Off. . |
| 0737962A2 | 10/1996 | European Pat. Off. . |
| 0762399A1 | 3/1997 | European Pat. Off. . |

OTHER PUBLICATIONS

"Principles of Optical Disc Systems", by Bouwhuis et al, ISBN 0–85274–785–3.

*Primary Examiner*—Tan Dinh

[57] ABSTRACT

An optical recording medium containing control information to set the write power at an optimum level for recording information on the medium. The control information includes a preset value of the derivative of the modulation of a read signal with respect to the write power. The optimum write power is derived from values of the modulation measured from test patterns on the medium and the preset value recorded on the medium.

13 Claims, 3 Drawing Sheets

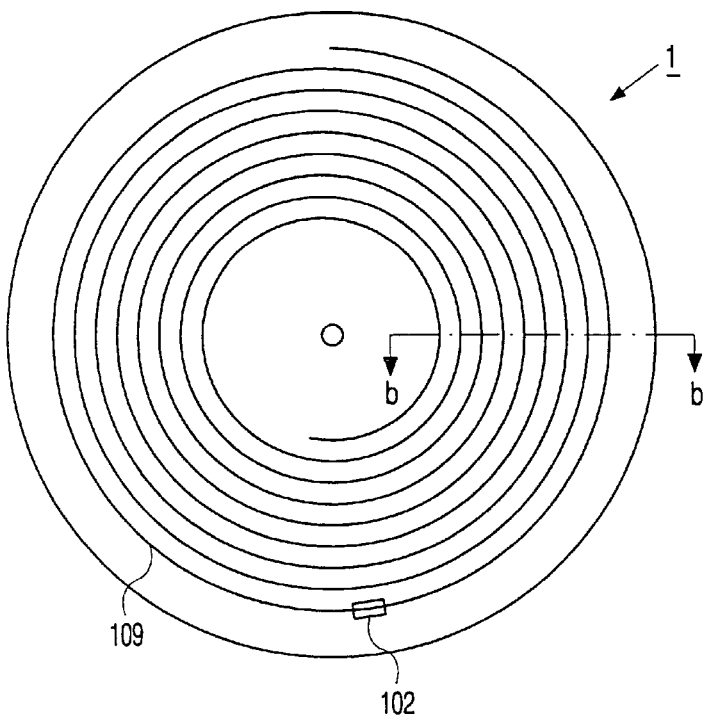
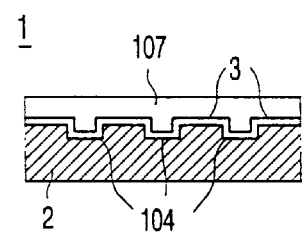
FIG. 4b
FIG. 4a
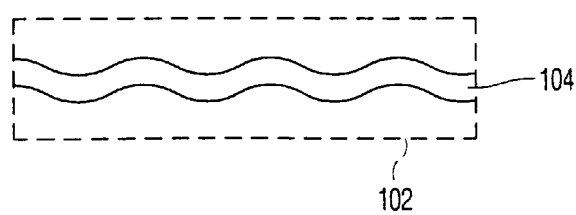
FIG. 4c
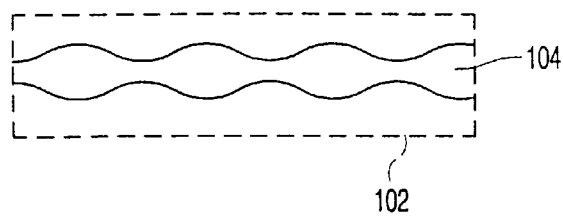
FIG. 4d

OPTICAL RECORDING MEDIUM WITH RECORDING CONTROL INFORMATION

FIELD OF THE INVENTION

The invention relates to the field of information recording on optical media, and more specifically to process control of such writing.

BACKGROUND OF THE INVENTION

The invention relates to an optical recording medium inscribable by a radiation beam, containing control information indicative of a recording process by which information can be recorded on the information carrier, the control information comprising values of recording parameters for the recording process.

Such a recording medium is known from EP-A-0 397 238 (PHN 12.925). This information carrier is a disc of an optically inscribable and readable type such as, for example, a Compact Disc Write Once (CD-WO), compatible with media of the CD class, and has a prerecorded track portion, a so-called pregroove. The pregroove is intended for recording optically readable patterns in accordance with the recording process, which patterns represent information. The pregroove is furthermore modulated with an auxiliary signal which contains address codes and control information. The control information comprises data useful for optimizing the recording process, such as the write power level required for recording.

An optical recording apparatus, set up for recording information on such a medium, can read the control information from the medium and adjust its recording parameters in accordance with the values recorded on the medium in order make a reliable recording of the information in the form of marks on the medium. Recording parameters are understood to be parameters which directly control the recording process. If the apparatus records information by modulating the power level of the radiation beam, these parameters may include one or more speeds of recording, power levels of the radiation beam used during the recording, such as a write power level, a bias power level, the duration of a first, intermediate and last pulses of a series of pulses used for writing a mark on the medium and duty cycles of these pulses. Several values of each parameters for specific recording speeds may be recorded. If the recording process includes erasure of previously recorded information either by direct overwrite or in a separate pass, the parameters may also include parameters related to the erase process such as the erase power.

Read parameters are understood to be parameters derivable from signals obtained when reading the information on the medium and which are useful for optimizing the value of one or more recording parameters. In general, a method for adjusting a specific recording parameter will involve recording a series of test patterns on the medium, each pattern having a different value of the recording parameter, measuring the read parameter of each pattern, and determining the optimum value of the recording parameter from this information. Examples of read parameters are the maximum value of a read signal, the modulation of a read signal, the reflection of the medium, the jitter of a read signal and the error rate of information recovered from the read signal.

European patent application no. 0 737 962 discloses an optical recording apparatus which does not require control information from an optical medium in order to set its write power level for recording information on the medium. Instead, the apparatus records a series of test patterns, each with increasing write power, on the medium. Next, it derives the modulation of each pattern from a read signal portion corresponding to the pattern. It calculates the derivative of the modulation as a function of write power and normalises the derivative by multiplying it by the write power over the modulation. The intersection of the normalised derivative with a preset value determines a write power level suitable for recording on this medium. The method thus uses the write power as recording parameter and the read signal modulation as the read parameter. This procedure for setting the optimum write power takes the different characteristics of the media into account by measuring the modulation of test patterns written on the media. Moreover, the method is independent of the specific recording apparatus used because of the normalised derivative employed in the procedure. The derivative is insensitive for apparatus parameters such as the numerical aperture of the objective lens for focusing the radiation beam on the medium, the intensity distribution over the radiation beam and the size of the spot formed by the radiation beam. The known method is designed to provide a proper setting of the write power level for each combination of recording apparatus and medium. However, experiments have revealed that the known method does not result in a proper write power level for all combinations of apparatuses and media.

The above citations are hereby incorporated in whole by reference.

SUMMARY OF THE INVENTION

It is an object of the invention to provide an optical recording medium that can be used in a method providing a proper value for the optimum write power of a radiation beam for recording information on the medium.

This object is achieved in accordance with the invention by an optical recording medium as described in the opening paragraph, which is characterized in that the control information comprises a value of a derivative of a read parameter with respect to a recording parameter. The improper write power levels in the above experiments were due to an unexpected dependance of the preset level on properties of the media to be recorded. Whereas all media properties were supposed to be characterized by the read signal from the test patterns, the derivative, used in order to be independent of apparatus properties, turns out to be dependent on media properties. It has been found that compatibility between apparatuses and media with regard to setting an optimum recording parameter level by the above derivative method can only be achieved when the preset value of the derivative is made dependent of the medium and is recorded on it. The preset value is preferably recorded by the manufacturer of the medium. A user of the medium may also record the preset value after having performed sufficient tests on the medium.

The recorded preset value is preferably the preset value of the normalised derivative. The derivative is normalized by multiplying it by the ratio of the recording parameter over the read parameter. Whereas the use of the derivative makes the method insensitive to offsets present in the recording apparatus, the normalisation makes the method also insensitive to different scaling factors in different apparatuses. Such scaling factors may be influenced by the efficiency with which the optical system in the apparatus can generate a read signal from a series of recorded marks on the medium and by the actual amplification of the read signal.

The derivative and the normalised derivative of the function may be determined in several ways. It is possible to determine the derivative by known numerical methods, e.g. by taking differences between the read parameter values and between the recording parameter values and calculating their ratios, or by the so-called Lagrange formula or n-point methods. Because numerical methods often magnify the noise present in the measured values, the derivative is preferably determined analytically from a function obtained by curve-fitting the read parameter values and recording parameter values. When the function is available in analytical form, the derivative need not be calculated anymore, but the optimum value of the recording parameter may be determined directly from the function and the preset value.

In a specific embodiment of the medium, the recording parameter is a value of a write power level of the radiation beam. The accurate setting of the write power level is of great importance for the quality of the resulting written marks. Other recording parameters may also be set to an optimum value by referring to a preset value of a derivative recorded on the medium, e.g. an erase power, bias power, the duration of a first, intermediate and last pulses of a series of pulses used for writing a mark on the medium and duty cycles of these pulses. If, for example, a series of test patterns is made with different duty cycle of the write pulses, the method enables the setting of an optimum duty cycle.

In a specific embodiment of the medium, the read parameter is a modulation of the amplitude of a read signal derived from information recorded on the medium. The modulation can easily be derived from a read signal and it is a suitable parameter for optimizing recording parameters. Other suitable read parameters are the reflection of the medium in recorded and unrecorded parts, and the number of errors in the information recovered from a series of specific test patterns or from a series of test patterns comprising random information, where the errors may be determined as bit errors or as byte errors.

The objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
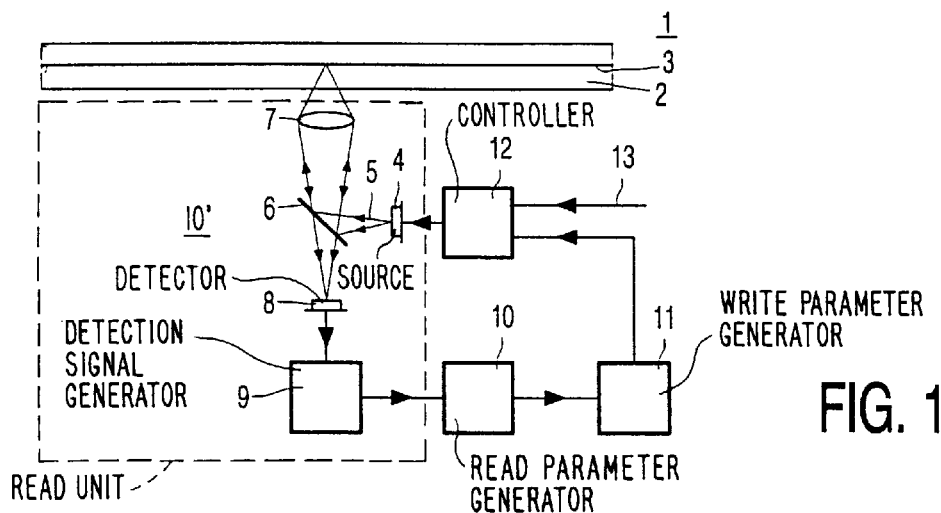
FIG. 1 is a diagram of an optical recording apparatus according to the invention.

FIG. 1 shows an apparatus and an optical recording medium 1 according to the invention. Medium 1 has a transparent substrate 2 and a recording layer 3 arranged on it. The recording layer comprises a material suitable for writing information by means of a radiation beam. The recording material may be of e.g. the magneto-optical type, the phase-change type, the dye type or any other suitable material. Information may be recorded in the form of optically detectable regions, also called marks, on recording layer 3. The apparatus comprises a radiation source 4, e.g. a semiconductor laser, for emitting a radiation beam 5. The radiation beam is converged on recording layer 3 via a beam splitter 6, an objective lens 7 and substrate 2. The medium may also be air-incident, where the radiation beam is directly incident on recording layer 3 without passing through a substrate. Radiation reflected from medium 1 is converged by objective lens 7 and, after passing through beam splitter 6, falls on a detection system 8, which converts the incident radiation in electric detector signals. The detector signals are input to a circuit 9. The circuit derives several signals from the detector signals, such as a read signal $S_R$ representing the information being read from medium 1. Radiation source 4, beam splitter 6, objective lens 7, detection system 8 and circuit 9 form together a read unit 10'. The read signal from circuit 9 is processed in a first processor 10 in order to derive signals representing a read parameter from the read signal and necessary for controlling the laser power level. The derived signals are fed in a second processor 11, which processes a series of values of the read parameter and based thereon derives a value for a write power control signal. The write power control signal is connected to a control unit 12. An information signal 13, representing the information to be written on medium 1, is also fed into control unit 12. The output of control unit 12 is connected to radiation source 4. A mark on recording layer 3 may be written by a single radiation pulse, the power of which is determined by the optimum write power level as determined by processor 11. A mark may also be written by a series of radiation pulses of equal or different lengths and one or more power levels determined by the write power signal. A processor is understood to mean any means suitable for performing calculations, e.g. a micro-processor, a digital signal processor, a hard-wired analog circuit or a field-programmable circuit.

The actual radiation power emitted by radiation source 4 may be measured by a not-shown detector arranged in an otherwise not-used side lobe of the radiation beam or in radiation reflected off an element in the optical path of the radiation beam. The signal of the detector may be connected directly to processor 11. Alternatively, the signal may be connected to control unit 12, where it may be combined with the peak amplitude of the read signal, to form a measure for the radiation power received at recording layer 3, and subsequently fed into processor 11.

Before writing information on medium 1 the apparatus sets its write power to the optimum value by performing the following procedure. First the apparatus writes a series of test patterns on medium 1. The test patterns should be selected so as to give a desired read signal. If the read parameter to be derived from the read signal is the maximum modulation of a read signal portion pertaining to a test pattern, the test pattern should comprise marks sufficiently long to achieve a maximum modulation of the read signal portion. When the information is coded according to the so-called eight-to-fourteen modulation (EFM), the test patterns preferably comprise the long $I_{11}$ marks of the modulation scheme. The test patterns are recorded each with a different write power. The range of the powers may selected on the basis of an indicative power level recorded as control information on the medium. Subsequent patterns may be written with a step-wise increased write power under the control of processor 11. The patterns may be written anywhere on the medium. They may also be written in specially provided test areas on the medium.

Figure 2:
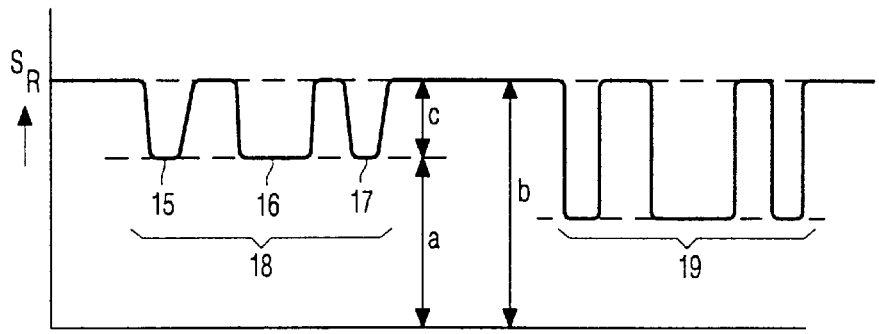
FIG. 2 illustrates two read signal portions from two test patterns.

FIG. 2 shows the read signal portions 18 and 19 obtained from two patterns written at two different write power levels. The drawn patterns comprise a short mark, a long mark and a short mark, as shown by the signal parts 15, 16 and 17, respectively in both read signal portion 18 and read signal portion 19. An actual pattern may comprise a few hundred marks of different or equal lengths.

Processor 10 derives from the read signal SR a read parameter to be used for determining the optimum write power. A possible read parameter is the ratio of the lowest amplitude of a read signal portion, for read signal portion 18 indicated by 'a' in FIG. 2, and the maximum amplitude of the same read signal portion, indicated by 'b'. A preferred read parameter is the normalised modulation, being the ratio of the maximum peak-to-peak value of a read signal, indicated by 'c', and the maximum amplitude 'b' of the read signal portion.

Figure 3:
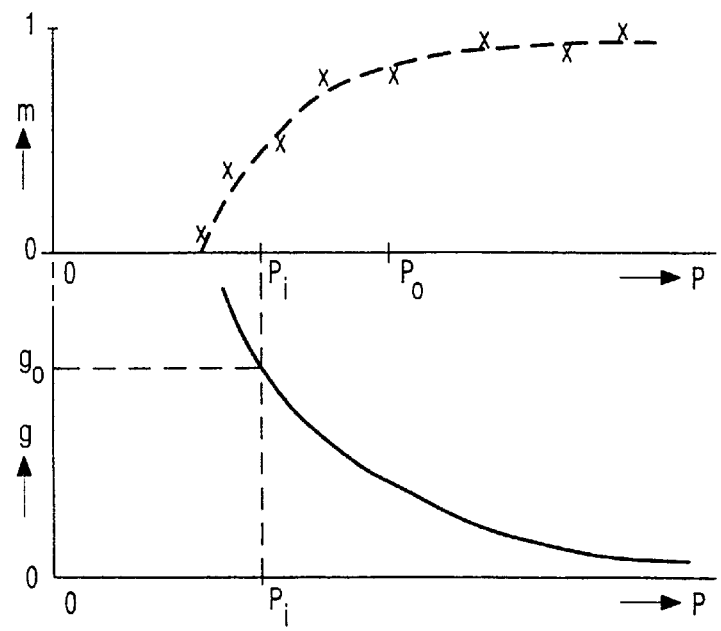
FIG. 3 is a graph showing the measured modulation as a function of write power and its derivative, FIGS. 4(a–d) shows a recording medium according to the invention.

After reading the test patterns on medium 1, processor 11 forms a series of value pairs for the modulation of a pattern and the write power with which that pattern has been written. The write powers may be taken from the value of the write power control signal during recording the test patterns, or from a measurement of the radiation power. FIG. 3 shows schematically the result of the processed read signal obtained from the test patterns; each cross represents a pair of values for the modulation m and the write power P of a test pattern, the crosses together forming a function of the modulation m versus the write power P. Processor 11 fits a curve through the measured modulation values in order to obtain an analytic expression for the variation of the modulation as a function of the write power. The curve is indicated in FIG. 3 by a dashed curve. The fitting may be done by the well-known least-squares fitting algorithm. The fitted curve is described by the function m(P).

As a next step, processor 11 calculates analytically a normalised derivative of the function m(P) with respect to the write power P. The normalised derivative g(P is equal to the function (dm/dP)P/m. The function g derived from the fitted modulation m in FIG. 3 is shown by the drawn curve.

Next, the processor derives an intermediate write power $P_i$ from the norinalised derivative. To this end it reads a preset value $g_0$ from the medium and determines the value of the write power P belonging to the preset value as indicated by the dashed lines in the lower half of FIG. 3. The value of $g_0$ may be a value set by the manufacturer of the recording medium and stored on the medium. As a next step, the value of the intermediate power $P_i$ is multiplied by a constant h larger than one, resulting in the optimum write power level $P_0$.

The values of the preset value $g_0$ and the multiplication constant h are determined by the manufacturer of the medium or by the user during initialisation of the medium and stored on the medium. The value of $g_0$ is set within a range from 0.2 to 5.0. For values higher than 5.0 the normalised derivative looses its predicting value, because the proximity of an asymptote may cause the values of P related to $g_0$ to lie closely together on the write power axis. The increased measurement error in the derivative is another reason to avoid values of $g_0$ larger than 5.0. For values of $g_0$ lower than 0.2 the normalised derivative has a small slope, through which small errors in the value of the derivative result in a large spread of the values of $P_i$ associated with $g_0$. Experiments on rewritable recording media having a CD format gave values of $g_0$ in a range from 0.2 to 2.0, and on media having a higher density in a range from 2.0 to 4.0. The multiplication constant h is set preferably within a range from 1.00 to 1.35 and is also recorded on the medium. The optimum write power $P_0$, equal to $(hP_i)$, is in general set to a value near the write power where the modulation m starts saturating. An optimum erase power may be derived from the optimum write power by taking the optimum erase power $P_e$ equal to $(kP_0)$, with k a multiplication constant. The constant k may be recorded on the medium and lies preferably within the range 0.40 to 0.66.

In a preferred method of setting $g_0$ and h, the optimum write power of a specific medium is determined by finding the write power which gives the lowest jitter of the read signal from information written on the medium. The information is preferably random information. Next, the normalised derivative dm/dP (P/m) is determined from a written series of test patterns as described above. A value for $g_0$ is selected which lies within the above range, i.e. where the normalised derivative is neither too flat nor too steep. The associated value of $P_i$ is determined by the normalised derivative. The value of h is now equal to $P_0/P_i$. These values of $g_0$ and h can be recorded on all media of the same type, i.e. made by the same production process, for use in all recording apparatuses. In general, different types of media, e.g. media from different manufacturers, have different recorded values of $g_0$ and, if necessary, also different recorded values of h. If for a certain application the value of h is fixed and is not recorded on the medium, the value of $g_0$ to be recorded should be selected such that the associated value of $P_i$ multiplied by the fixed value of h results in the optimum write power $P_o$.

The value of the normalised derivative turns out to be hardly affected by variations of parameters of the recording apparatus. If the optimum write power level is selected in dependence on the normalised derivative, the selected level is suitable for reliable recording on a large variety of recording media by different recording apparatuses. The write power level may be selected by taking the power level corresponding to a preset value of the normalised derivative. The advantages of the use of the normalised derivative may also be achieved when no curve-fitting is performed. In that case the derivative may be determined from the read parameter versus write power level data by e.g. calculating differences between the measured values. However, omitting the step of curve-fitting will increase the noise in the values of the derivative, thereby thwarting the use of the derivative for setting the optimum write power for some media.

The function to be fitted through the pairs of values (m,P) may be one or more polynomials, which are preferably orthogonal. The curve may then be written as:

$$m(P) = \sum_i a_i f_i(P) \tag{1}$$

The normalised derivative is given in the analytic form $$g(P) = \frac{P \sum_i a_i f_i'(P)}{\sum_i a_i f_i(P)} \tag{2}$$

where f'(P) is the derivative of function f with respect to the parameter P. The value of $P_i$ can be found from the equation $$g(P_i) = g_0. \tag{3}$$

Depending on the choice of the curve to be fitted, the value of $P_i$ can be found in the form of an analytic expression or as the result of a numerical successive root approximation method such as the regula falsi or Newton's method. The use of an analytic expression, when possible, has the advantage that it provides the correct root, whereas a successive approximation may divert to an undesired root of the equation. When an analytic form of equation (3) can be found, the normalised derivative g need not be determined anymore, but the preset value $g_0$ may be inserted directly into equation (3) for determining the associated value of $P_i$.

A suitable set of orthogonal polynomials $f_i$ are the Legendre polynomials. The four lowest order Legendre polynomials are given by:

$$f_0(P) = 1 \qquad (4)$$
$$f_1(P) = P$$
$$f_2(P) = \frac{3}{2}P^2 - \frac{1}{2}$$
$$f_3(P) = \frac{5}{2}P^3 - \frac{3}{2}P$$

Since these polynomials are defined on the interval $-1 < P < +1$ and the write powers are taken from a range $P_{min}$ to $P_{max}$, the write power values to be fitted should be scaled according to $$P_s = \frac{2P - (P_{max} + P_{min})}{P_{max} - P_{min}} \qquad (5)$$

The scaled write power levels $P_s$ must now be used in the formulae of equation (4). The value of $P_i$ found from equation (3) must be scaled back to the range $P_{min}$, $P_{max}$.

When using a digital processor, the input values of m and P must be converted from an analog value to a digital value by an analog-to-digital convertor. The number of bits of the digital output values can be made to correspond to the noise in the measured values. If, for example, the noise in the values of a parameter is 1% of the maximum value of the parameter, the convertor should be at least 8 bits deep, thereby introducing an additional $\frac{1}{2}^8 = \frac{1}{256}$ quantization noise.

If processor 11 in which the above calculations are made is a small processor for reason of costs, the calculations are preferable performed in an integer format. The values of m and P should therefore be converted from real to integer values. The multiplication constant for this conversion should be large enough not to introduce additional noise and small enough not to require too require much computing power. A good guide is to choose the constant such that the noise present in the value of m or P, as determined in the integer representation of the value, is slightly larger than the value corresponding to the least significant bit in the integer representation. The noise in the value includes the above-mentioned quantisation noise. If, for example, the noise in the values of m is 0.5% of the maximum value of m, then a multiplication factor of about 1000 divided by the maximum value of the parameter is reasonable.

Instead of using a series of polynomials for fitting the values of m and P, a single function may also be used. The function preferably has an asymptote for large values of P. It should have several parameters the values of which are to be determined by the curie-fitting. The function should have parameters for the value of the function at small values of P, for the derivative of the function at intermediate values of P and for the value of the function at larger values of P. A suitable function is $$f(P) = a_0 - \frac{a_1}{P - a_2} \qquad (6)$$

The normalised derivative can be given in an analytic form. Equation (4) reduces then to a quadratic equation, allowing to find the root without successive approximation.

Other suitable functions are the arc tangent and the hyperbolic tangent:

$$f(P) = a_0 \arctan(a_1 P - a_2) \qquad (7)$$
$$f(P) = a_0 \tanh(a_1 P - a_2). \qquad (8)$$

The values of the arc tangent and the hyperbolic tangent may be stored in a look-up table to speed up the calculations.

FIG. 4a shows disc-shaped recording medium 1 according to the invention. The recording medium has a continuous track 109 intended for recording, which is arranged in a helical pattern of windings. The windings may also be arranged concentrically instead of helically. The location of track 109 on the recording medium is indicated by a servo pattern, for example in the form of a pregroove 104, which enables a read/write head to follow track 109 during scanning. Alternatively, a servo pattern may be, for example, uniformly distributed sub-patterns which periodically cause signals to develop in a servo tracking system. FIG. 4b shows a section along line b-b of recording medium 1, in which substrate 2 is covered by recording layer 3 and a layer 107 and the cross-section of three grooves 104 is visible. Pregroove 104 may also be formed as a raised part of the substrate or as a material having a property differing from its surroundings. The recording layer 3 can be inscribed optically or magneto optically by an recording apparatus. Information on the recording medium is represented by patterns of marks. Information is recorded in track 109 by a recording process in which each mark is formed by one or more recording pulses of constant or varying write power depending on, for example, the length of the mark. The recording parameters of the recording process, such as the write power, the number of pulses, the variation and the duty cycle, are to be tuned to the recording medium, in particular to the material properties of this recording medium. An example of an inscribable record carrier is the known CD Write Once or CD-MO for computer-use. An extensive description of the inscribable CD system that similarly comprises information, may be found in U.S. Pat. No. 4,901,300 (PHN 12.398) and U.S. Pat. No. 5,187,699 (PHQ 88.002). A description of the reading of a CD and the use of a pregroove portion can be found in the book "Principles of optical disc systems" by Bouwhuis et al., ISBN 0-85274-785-3. These citations are hereby incorporated in whole by reference.

FIGS. 4c and 4d each show an enlarged section 102 of medium 1 comprising a specific embodiment of a groove having a periodic modulation (wobble). This wobble causes an additional signal to arise in a servo tracking pick-up. The wobble is, for example, frequency-modulated with an auxiliary signal and information is coded in the auxiliary signal. A description of a recording medium having such information recorded in the groove may be found in EP-A 0 397 238. The pregroove is very suitable for recording control information indicative of the recording process. Recording media of a different type, such as, for example, an optical tape, may be provided with control information in a different manner, for example, by arranging a control area at the beginning of the tape or along an auxiliary track.

When the medium is read at the nominal speed for a CD-type medium, the additional signal from the pregroove has a frequency of 22.05 kHz frequency modulated with a 1 kHz deviation. After FM demodulation and digitization, a bitstream having a bit rate of 3150 bits/s results. The bitstream is divided in frames of 42 bits each, each frame comprising 4 synchronization bits, 24 information bits and 14 error correction bits, in this order. The contents of the information stored in a frame depend on the position of the frame in the bitstream. In a group of ten frames nine consecutive frames comprise a timecode called ATIP (absolute time in pregroove), to be used as address for accessing user information on the medium. The tenth frame out of the group of ten frames comprises control information. Three consecutive control information frames, spaced by nine timecode frames, comprise an indicative value for the power $P_i$, a value for the multiplication factor h, a value for the normalised derivative $g_0$ and a value for the multiplication constant k. The frames comprising control information are preferably located prior to an area used for recording user information, e.g. the lead-in area of a CD-type medium.

Figure 5:
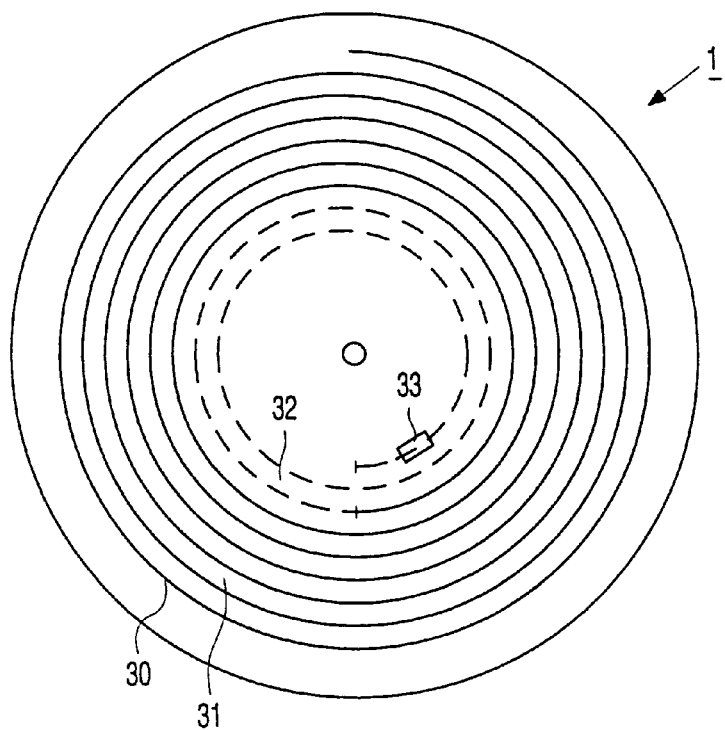
FIG. 5 is a plan view of a recording medium.
Figure 6:
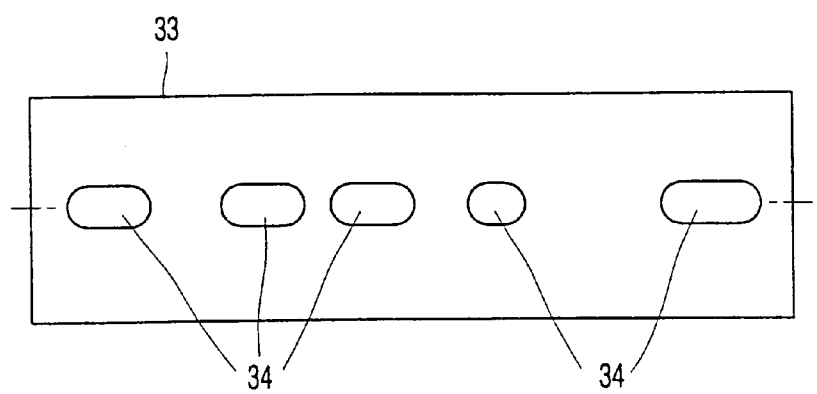
FIG. 6 is a plan view of a pattern of marks in the medium.

FIG. 5 shows another embodiment of recording medium 1, provided with a track 30. The track may be circular or spiral and in the form of for example an embossed groove or ridge. The area of the medium is divided in an information recording area 31 for writing user information and a control area 32 for storing information relevant for writing, reading and erasing information on the medium and in general not intended for recording user information. Control area 32 is marked by a dashed track in the Figure. Information recording area 31 is of a type which is subject to change in an optically detectable property when exposed to radiation above a specific write power level. The value of $g_0$ may be stored as a pattern of control information in control area 32 of the medium. When the control area is embossed, the manufacturer of the medium must record the value. Alternatively, the user may record the value in the medium during for instance initialisation of the medium, allowing the recording of a disc-specific value. The values of h and k may also be recorded like the value of $g_0$. FIG. 6 shows a strongly enlarged portion of track 33 comprising a pattern of marks 34 in which the control information is encoded.

Although the invention has been explained by an embodiment using the write power as recording parameter and the read signal modulation as read parameter, it will be clear that other combinations of recording and read parameter can be employed in the invention. For example, a specific timing of the pulse pattern used for recording a mark can be used as recording parameter and the jitter of the read signal as the read parameter.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. An optical recording medium inscribable by a radiation beam, comprising:

a substrate; and means on the substrate, including control information, for indicating a recording process by which information are recorded on the recording medium, the control information including values of recording parameters for the recording process, the values including a value of a derivative of a read parameter with respect to a recording parameter.

2. The medium of claim 1, wherein the value of the derivative is normalized by multiplying the derivative by the ratio of the recording parameter over the read parameter.

3. The medium of claim 1, wherein the recording parameter is a value of a write power level of the radiation beam.

4. The medium of claim 1, wherein the read parameter is a modulation of the amplitude of a read signal derived from information recorded on the medium.

5. The medium of claim 4, wherein the modulation is proportional to the ratio of a peak-to-peak value of the read signal and a maximum value of the read signal.

6. The medium of claim 5, wherein the value of the normalized derivative lies within a range from 0.2 to 5.0.

7. The medium of claim 1, wherein the control information includes a multiplication constant h such that $P_o=h*P_i$, where $P_o$ is an optimum write power level for writing information on the medium and $P_i$ a write power level derived from a directive value of the derivative.

8. The medium of claim 7, wherein the control information includes a multiplication constant k such that $P_e=k*P_o$, where $P_e$ is an optimum erase power level for erasing information on the medium.

9. An Optical recording medium, comprising:

a substrate; and control information on the substrate including a first recording parameter normalized by multiplying the first recording parameter by the ratio of a second recording parameter over a read parameter.

10. An Optical recording medium, comprising:

a substrate; and control information on the substrate including a recording parameter depending on the modulation of the amplitude of a read signal derived from information recorded on the medium wherein the modulation is proportional to the ratio of a peak-to-peak value of the read signal and a maximum value of the read signal.

11. The medium of claim 10 in which the recording parameter lies within a range from 0.2 to 5.0.

12. An Optical recording medium, comprising:

a substrate; and control information on the substrate including a multiplication constant h such the $P_o=h*P_i$, where $P_o$ is an optimum write power level for writing information on the medium and $P_i$ a write power level derived from a directive value of a derivative.

13. An Optical recording medium, comprising:

a substrate; and control information on the substrate including a multiplication constant k such that $P_e=k*P_o$, where $P_e$ is an optimum erase power level for erasing information on the medium and $P_o$ is an optimum write power level for writing information on the medium.

* * * * *